March 21, 1950     A. H. WOODLE     2,501,428
FISH LURE
Filed May 3, 1947
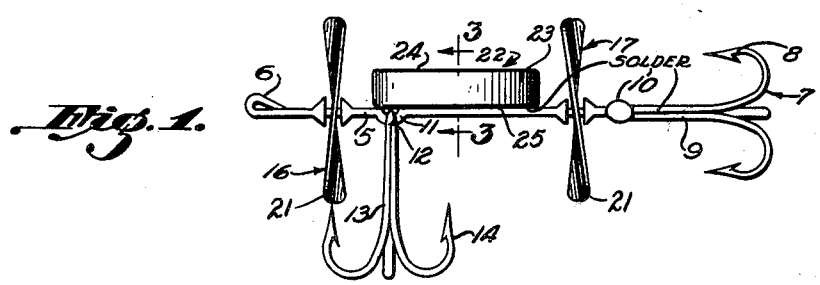
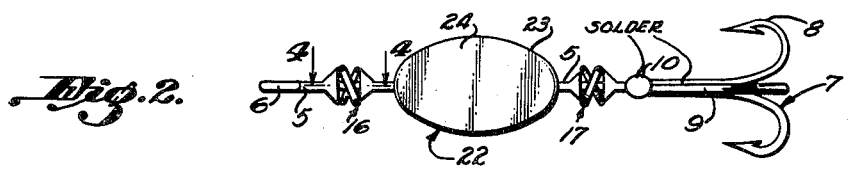
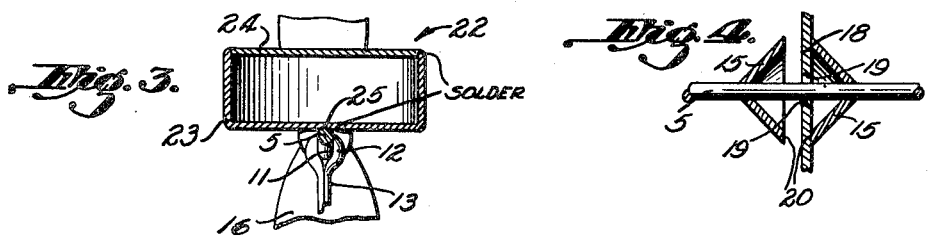
INVENTOR.
Alexander H. Woodle Patented Mar. 21, 1950

2,501,428

UNITED STATES PATENT OFFICE 2,501,428

FISH LURE

Alexander H. Woodle, Greenwood, S. C.

Application May 3, 1947, Serial No. 745,867

6 Claims. (Cl. 43—42.31)

My invention relates to fish lures.

An important object of the invention is to provide means for amplifying the noise produced by the spinner or spinners of the fish lure.

A further object of the invention is to provide a fish lure having a spinner or spinners loosely mounted thereon so that they will produce a rattling or humming noise in motion, which rattling or humming noise is suitably increased by the sound amplifier.

A further object of the invention is to provide a sound amplifier of simple construction and which may be rendered attractive in appearance to the fish and which may also serve to some extent as a float.

Other objects and advantages will be apparent during the course of the following description.

In the accompanying drawings forming a part of this application and in which like numerals are employed to designate like parts throughout the same, Figure 1 is a side elevation of the fish lure embodying my invention, Figure 2 is a plan view of the same, Figure 3 is a transverse section taken on line 3—3 of Figure 1, Figure 4 is an enlarged longitudinal section taken on line 4—4 of Figure 2.

In the drawings, wherein for the purpose of illustration is shown a preferred embodiment of my invention, the numeral 5 designates a rod which is stiff and somewhat resilient. This rod is formed of metal and is preferably formed of a nickel-silver alloy. This alloy is strong, stiff, and somewhat resilient, and parts may be easily soldered to it. At one end of the rod 5 an eye 6 is formed, for attachment to the line, and a hook unit 7 is provided at the rear end of the rod 5. This hook unit is shown as comprising three hooks 8, although I contemplate using a greater number of hooks or a lesser number or even one hook. This hook unit includes a stiff shank 9 which is rigidly connected with the rear end of the rod 5 by solder 10 or the like. The shank extends longitudinally of the rod in alignment therewith and is in effect a continuation of the rod 5. Near its longitudinal center the rod 5 is bent to form a loop 11. This loop is preferably received within a loop or eye 12 of a depending freely pivoted hook unit 13, shown as including three hooks 14, although a greater or lesser number may be employed or one hook may be used.

Disposed near the front and rear ends of the rod 5 are pairs of spaced collars 15, which are hollow and conical and formed of metal and soldered or otherwise rigidly mounted upon the rod 5. The collars in each pair have their large ends arranged inwardly. The numerals 16 and 17 designate front and rear metal spinners. Each spinner includes a flat hub 18, having a central opening 19 loosely receiving the rod 5. The diameter of the opening 19 is considerably larger than the diameter of the rod 5, to permit of the free angular movements or play of the spinner, within limits. The edges 20 of the conical collars 15 are spaced a greater distance than the thickness of the hub 20, and this permits of the free angular movements of the spinner within limits. When the spinner is angularly disposed, the hub will be inclined and contact with the edges 20 of the two collars 15. This contacting of the hub with the edges 20 prevents the binding of the spinner upon the rod at the opening 19. Each spinner includes radial blades 21, preferably having rounded ends, as shown. The spinners 16 and 17 are identical except that the blades of the spinner 16 are pitched in one direction while the blades of the spinner 17 are pitched in the opposite direction, whereby the spinners will turn in opposite directions when the lure is pulled through the water. The two spinners are of course mounted upon the rod in the identical manner. It is preferred to use two spinners although I contemplate using only one. By virtue of the loose mounting of the metal spinners on the rod, when the spinners rotate they produce a rattling or humming metallic noise.

I provide means to amplify this rattling or humming noise. The amplifying means comprises a metallic sounding box 22, which is filled with air and is completely closed and hermetically sealed. The sounding box is preferably elongated and of elliptical shape and includes a side 23, a top 24, and a bottom 25. The top and bottom are flat and serve as sounding boards. The box is formed of thin sheet metal, and I have found that satisfactory results are obtainable by having this sheet metal from one sixty-fourth ($1/64$) to one one-hundred twenty-eighth ($1/128$) of an inch in thickness. The sheet metal should be thin, as indicated, although the invention is not necessarily restricted to the precise thickness indicated. This sheet metal should be stiff and resilient and may be steel, a nickel-silver alloy, or the like. The flat top and bottom 25 are spaced and arranged parallel. The box 22 may be painted in any color and design to attract the fish. However, painting may be dispensed with.

The amplifying box 22 is arranged above the rod 5 and is preferably equidistantly spaced from the spinners. The central longitudinal axis of the sounding box is in alignment with the rod 5. The bottom 25 of the sounding box is rigidly attached to the rod 5 by soldering, as indicated at 26 and is in contacting relation thereto.

In use, the line is attached to the eye 6 and the lure is cast or trolled in the usual manner. The sounding box 22 serves as a float, to a certain extent, and keeps the lure upright while traveling in the water. The depth that the lure will travel in the water is controlled by the user. When the lure is traveling forwardly longitudinally in the water the spinners 16 and 17 are rapidly rotating and due to their loose mounting upon the rod produce a rattling, humming, or metallic noise. This rattling or humming noise is transmitted to the sounding box 22, in contact with the rod 5, to receive vibrations therefrom. The top and bottom 24 and 25 are caused to vibrate, and function as sounding boards, thereby amplifying the sound. The confined air within the hermetically sealed or closed sounding box causes the top and bottom to vibrate. I have found that the closed sounding box 22 materially increases or amplifies the rattling or humming sound produced by the spinners. It has been found that the present device, by virtue of the amplified rattling, humming, or metallic sound, is very attractive to game fish, such as bass, goggle eyed perch, trout, and the like, who readily strike the lure. The device will produce the rattling or humming sound when the lure is traveling beneath the water as well as when traveling at the surface of the water.

It is to be understood that the form of my invention herewith shown and described is to be taken as a preferred example of the same and that various changes in the size, shape, and arrangement of parts may be resorted to without departing from the spirit of my invention or the scope of the subjoined claims.

Having thus described my invention, what I claim is:

1. A lure comprising a metal rod, a metal spinner loosely and rotatably mounted upon the metal rod for producing a rattling or humming sound, and a hermetically sealed sounding box rigidly connected with the metal rod, said sounding box being formed of thin resilient sheet metal having a thickness of approximately 1/100 of an inch and including opposed vibrating sides.

2. A lure comprising a metal rod, spaced collars mounted upon the metal rod, a metal spinner mounted upon the rod between the collars, the spinner having an opening to receive the rod and having a substantially greater diameter than the rod, the space between the collars being substantially greater than the thickness of the spinner, and the collars being disposed so close to each other that the spinner contacts with both collars at the same time when it is inclined with relation to the rod, a sounding box formed of resilient thin sheet metal having a thickness of approximately 1/100 of an inch and including opposed substantially flat vibratory sides, means to mount the sounding box upon the rod so that the vibrations of the rod may be transmitted to the sounding box, and hook means secured to the rod.

3. A lure comprising a metal rod, a hermetically sealed metallic sounding box having a substantially flat top and bottom, the top and bottom being formed of thin resilient metal having a thickness of approximately 1/100 of an inch, means to mount the sounding box upon the rod, metallic spinners loosely and rotatably mounted upon the rod forwardly and rearwardly of the sound box for producing a rattling or humming sound, hook means rigidly secured to the rear end of the rod, and hook means pivotally connected with the rod between the ends of the rod.

4. A fishing lure, comprising a metal rod provided with a line attaching means and having a pair of spaced enlargements, the enlargements of the pair having substantially flat opposed faces, a spinner arranged between the spaced enlargements and having a substantially flat hub, the hub having an opening to receive the rod which opening has a considerably larger diameter than the rod for producing a loose wabbling fit, the enlargements being spaced for a distance considerably greater than the thickness of the hub but arranged sufficiently close so that the hub is retained within striking distance of both enlargements in the pair, a closed metal sound box having vibratory walls which are thin and having a thickness of from 1/64 of an inch to 1/128 of an inch, said metal sound box being carried by the rod and receiving vibrations therefrom, and hook means carried by the rod, the striking of the enlargements by the spinner causing vibration of the rod and vibration of the sound box.

5. A fishing lure, comprising a rod provided with a line attaching means and having a pair of spaced enlargements, the enlargements of the pair having opposed faces, a spinner arranged between the spaced enlargements and having a hub, the hub having an opening to receive the rod which opening has a considerably larger diameter than the rod for producing a loose wabbling fit, the enlargements being spaced for a distance considerably greater than the thickness of the hub but arranged sufficiently close so that the hub may engage both enlargements in the pair at the same time, a closed metal sound box having opposed vibratory sides, said sound box being mounted upon the rod to be vibrated thereby, and hook means carried by the rod.

6. A lure comprising a metal rod, a rotary metal spinner carried by the rod and having an opening formed therein to receive the rod, said opening having a considerably larger diameter than the rod so that the spinner has a wobbling action upon the rod to produce a hammering action, and a closed sounding box including substantially flat vibratory sides, said sides being formed of resilient thin sheet metal having a thickness of approximately 1/100 of an inch, said box having means to mount the same upon the rod so that vibrations of the rod are transmitted to the sounding box, and hook means secured to the rod.

ALEXANDER H. WOODLE.

REFERENCES CITED

The following references are of record in the file of this patent:

UNITED STATES PATENTS

| Number | Name | Date |
|---|---|---|
| 538,169 | Kelley | Apr. 23, 1895 |
| 671,613 | Shakespeare et al. | Apr. 9, 1901 |
| 747,976 | Junod | Dec. 29, 1903 |
| 1,297,354 | Jay | Mar. 18, 1919 |
| 2,008,437 | DeWitt | July 16, 1935 |
| 2,078,816 | Shenitz | Apr. 27, 1937 |